(12) United States Patent
Kuffner

(10) Patent No.: US 11,826,897 B2
(45) Date of Patent: Nov. 28, 2023

(54) ROBOT TO HUMAN FEEDBACK

(71) Applicant: Google LLC, Mountain View, CA (US)

(72) Inventor: James Joseph Kuffner, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/457,831

(22) Filed: Dec. 6, 2021

(65) Prior Publication Data

US 2022/0088776 A1 Mar. 24, 2022

Related U.S. Application Data

(63) Continuation of application No. 16/695,532, filed on Nov. 26, 2019, now Pat. No. 11,220,003, which is a continuation of application No. 15/872,168, filed on Jan. 16, 2018, now Pat. No. 10,525,590, which is a continuation of application No. 14/835,411, filed on Aug. 25, 2015, now Pat. No. 9,902,061.

(60) Provisional application No. 62/041,299, filed on Aug. 25, 2014.

(51) Int. Cl.
*B25J 9/16* (2006.01)
*H04W 4/30* (2018.01)
*H04W 4/80* (2018.01)
*B25J 19/06* (2006.01)

(52) U.S. Cl.
CPC .............. *B25J 9/163* (2013.01); *B25J 9/1674* (2013.01); *H04W 4/30* (2018.02); *H04W 4/80* (2018.02); *B25J 19/061* (2013.01)

(58) Field of Classification Search
CPC ........ B25J 9/163; B25J 9/1674; B25J 19/061; H04W 4/30; H04W 4/80
See application file for complete search history.

(56) References Cited

U.S. PATENT DOCUMENTS

| | | | |
|---|---|---|---|
| 7,349,758 B2 | 3/2008 | Miro et al. | |
| 8,140,188 B2 | 3/2012 | Takemitsu et al. | |
| 8,583,282 B2 | 11/2013 | Angle et al. | |
| 2006/0038688 A1 | 2/2006 | Nakamura | |
| 2006/0049939 A1* | 3/2006 | Haberer | F16P 3/142 |
| | | | 340/541 |
| 2008/0161970 A1* | 7/2008 | Adachi | B25J 9/1697 |
| | | | 901/49 |
| 2009/0055019 A1 | 2/2009 | Stiehl et al. | |
| 2012/0328404 A1 | 12/2012 | Froelich et al. | |
| 2013/0184980 A1* | 7/2013 | Ichikawa | G05D 3/12 |
| | | | 701/301 |

(Continued)

*Primary Examiner* — Dale Moyer
(74) *Attorney, Agent, or Firm* — McDonnell Boehnen Hulbert & Berghoff LLP

(57) ABSTRACT

Example implementations may relate to a robotic system configured to provide feedback. In particular, the robotic system may determine a model of an environment in which the robotic system is operating. Based on this model, the robotic system may then determine one or more of a state or intended operation of the robotic system. Then, based one or more of the state or the intended operation, the robotic system may select one of one or more of the following to represent one or more of the state or the intended operation: visual feedback, auditory feedback, and one or more movements. Based on the selection, the robotic system may then engage in one or more of the visual feedback, the auditory feedback, and the one or more movements.

18 Claims, 13 Drawing Sheets

(56) References Cited

U.S. PATENT DOCUMENTS

| | | |
|---|---|---|
| 2013/0338525 A1 | 12/2013 | Allen |
| 2015/0006240 A1 | 1/2015 | Kanamaru et al. |
| 2015/0049911 A1* | 2/2015 | Doettling ................ F16P 3/142 |
| | | 382/103 |
| 2015/0131896 A1* | 5/2015 | Hu ........................ G06V 40/28 |
| | | 382/153 |
| 2015/0158178 A1* | 6/2015 | Burmeister ........... G06T 1/0014 |
| | | 382/203 |
| 2015/0217455 A1* | 8/2015 | Kikkeri ................ G06T 7/0004 |
| | | 700/259 |
| 2015/0339589 A1 | 11/2015 | Fisher |
| 2016/0016315 A1 | 1/2016 | Kuffner, Jr. et al. |
| 2019/0258913 A1 | 8/2019 | Tournois et al. |

* cited by examiner

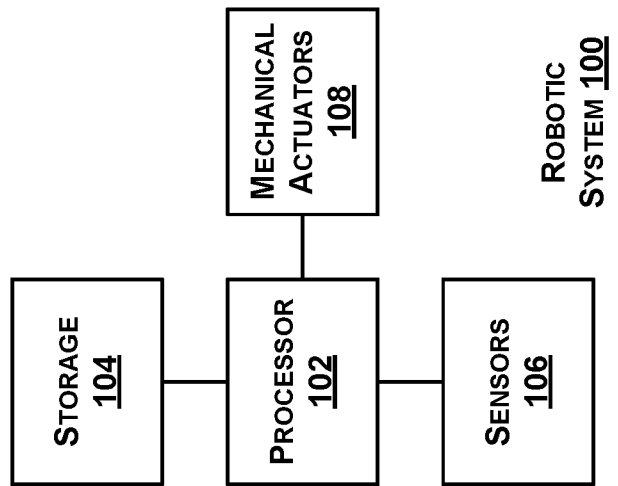

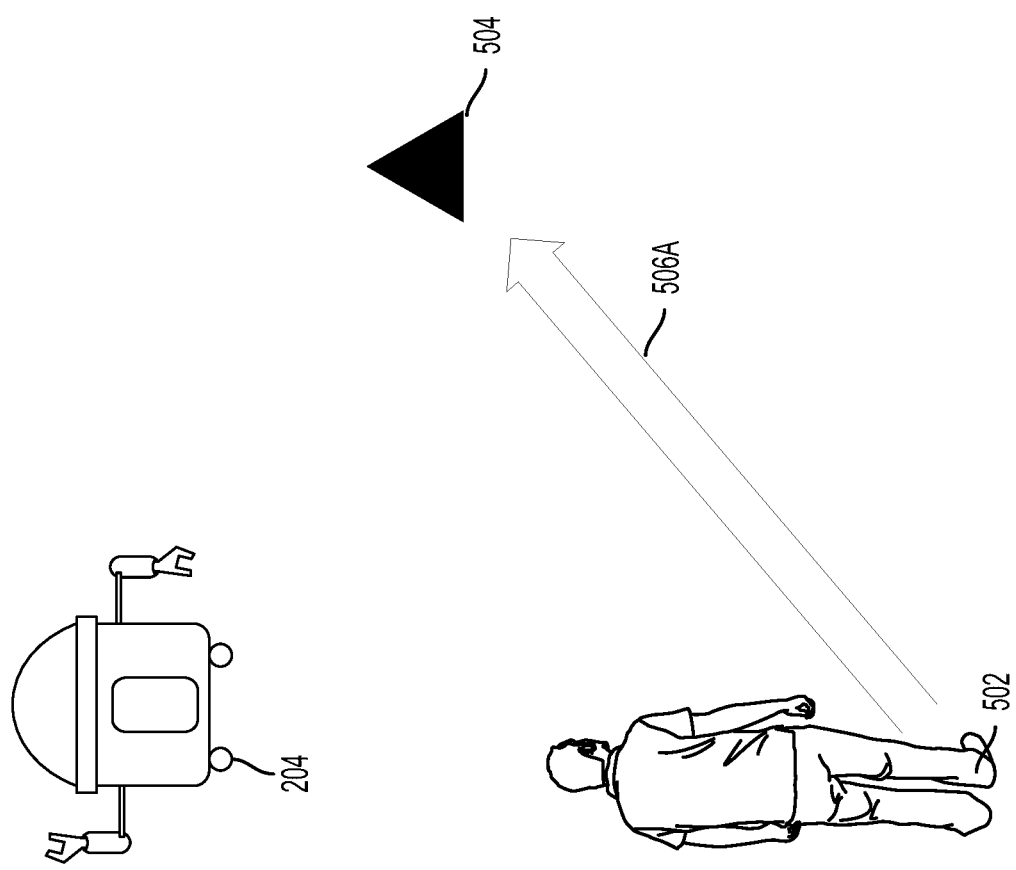

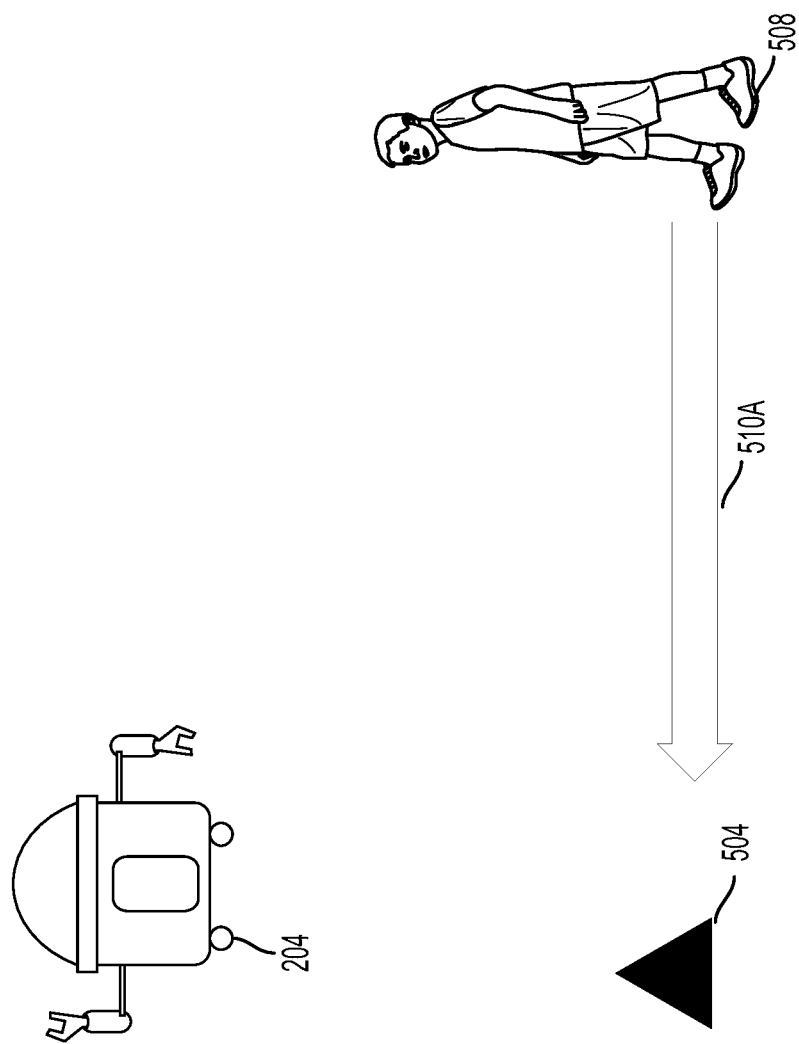

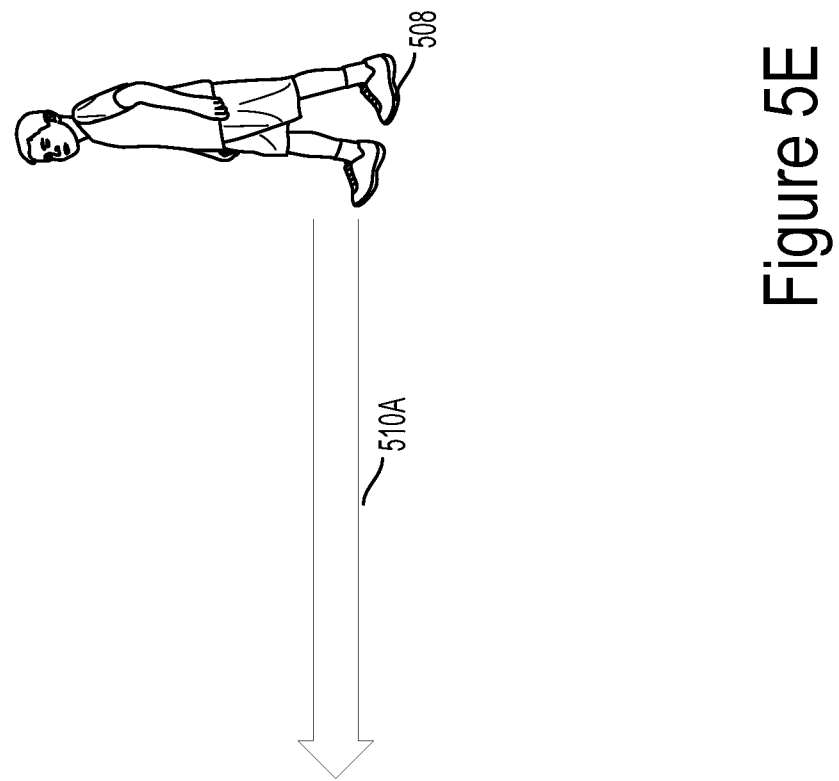
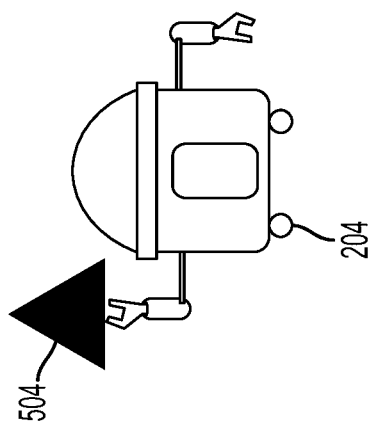
Figure 5E

ROBOT TO HUMAN FEEDBACK

CROSS REFERENCE TO RELATED APPLICATION

The present application is a continuation of U.S. patent application Ser. No. 16/695,532, filed on Nov. 26, 2019 and entitled "Robot to Human Feedback," which is a continuation of U.S. patent application Ser. No. 15/872,168, filed on Jan. 16, 2018 and entitled "Robot to Human Feedback," which is a continuation of U.S. patent application Ser. No. 14/835,411, filed on Aug. 25, 2015 and entitled "Robot to Human Feedback," which claims priority to U.S. Provisional patent application Ser. No. 62/041,299 filed on Aug. 25, 2014 and entitled "Robot to Human Feedback," all of which are hereby incorporated by reference in their entirety.

BACKGROUND

Unless otherwise indicated herein, the materials described in this section are not prior art to the claims in this application and are not admitted to be prior art by inclusion in this section.

Robotic systems may be used for applications involving material handling, welding, assembly, dispensing, and companionship, among others. Over time, the manner in which these robotic systems operate is becoming more intelligent, more efficient, and more intuitive. As robotic systems become increasingly prevalent in numerous aspects of modern life, the need for robotic systems that can properly interact with humans and the environment becomes apparent. Therefore, a demand for such robotic systems has helped open up a field of innovation in sensing techniques, feedback modes, as well as component design and assembly.

SUMMARY

Example implementations may relate to methods and systems for a robotic system to provide feedback to a human. A robotic system may be configured to provide feedback to a human by, for instance, operating a visual indicator, operating an auditory indicator, using gestures, and/or sending notifications to a computing device. In particular, the robotic system may evaluate the surroundings in which the robotic system is located and may determine a performance metric based on such an evaluation. The performance metric may be associated, for example, with a level of safety of a situation in the surroundings and/or with a task that the robotic system carrying out in the surroundings. Based on such a metric, the robotic system may select an operating mode that includes providing the appropriate feedback based on the situation in the surroundings.

In one aspect, a method is provided. The method involves determining, by a robotic system, a model of an environment in which the robotic system is operating. The method also involves determining, by the robotic system, one or more of a state or intended operation of the robotic system based at least in part on the model of the environment. The method additionally involves, based at least in part on one or more of the state or the intended operation, making a selection, by the robotic system, of one or more of visual feedback to represent one or more of the state or the intended operation, auditory feedback to represent one or more of the state or the intended operation, and one or more movements to represent one or more of the state or the intended operation. The method further involves, based at least in part on the selection, engaging, by the robotic system, in one or more of the visual feedback to represent one or more of the state or the intended operation, the auditory feedback to represent one or more of the state or the intended operation, and the one or more movements to represent one or more of the state or the intended operation.

In another aspect, a robotic system is provided. The robotic system includes one or more processors, a non-transitory computer readable medium, and program instructions stored on the non-transitory computer readable medium and executable by the one or more processors to determine a model of an environment in which the robotic system is operating. The instructions are also executable to determine one or more of a state or intended operation of the robotic system based at least in part on the model of the environment. The instructions are additionally executable to, based at least in part on one or more of the state or the intended operation, make a selection of one or more of visual feedback to represent one or more of the state or the intended operation, auditory feedback to represent one or more of the state or the intended operation, and one or more movements to represent one or more of the state or the intended operation. The instructions are further executable to, based at least in part on the selection, engage in one or more of the visual feedback to represent one or more of the state or the intended operation, the auditory feedback to represent one or more of the state or the intended operation, and the one or more movements to represent one or more of the state or the intended operation.

In yet another aspect, a non-transitory computer readable medium is provided. The non-transitory computer readable medium has stored therein instructions executable by one or more processors to cause a robotic system to perform functions. The functions include determining a model of an environment in which the robotic system is operating. The functions also include determining one or more of a state or intended operation of the robotic system based at least in part on the model of the environment. The functions additionally include, based at least in part on one or more of the state or the intended operation, making a selection of one or more of visual feedback to represent one or more of the state or the intended operation, auditory feedback to represent one or more of the state or the intended operation, and one or more movements to represent one or more of the state or the intended operation. The functions further include, based at least in part on the selection, engaging in one or more of the visual feedback to represent one or more of the state or the intended operation, the auditory feedback to represent one or more of the state or the intended operation, and the one or more movements to represent one or more of the state or the intended operation.

In yet another aspect, a system is provided. The system may include means for determining a model of an environment in which the robotic system is operating. The system may also include means for determining one or more of a state or intended operation of the robotic system based at least in part on the model of the environment. The system may additionally include means for, based at least in part on one or more of the state or the intended operation, making a selection of one or more of visual feedback to represent one or more of the state or the intended operation, auditory feedback to represent one or more of the state or the intended operation, and one or more movements to represent one or more of the state or the intended operation. The system may further include means for, based at least in part on the selection, engaging in one or more of the visual feedback to represent one or more of the state or the intended operation, the auditory feedback to represent one or more of the state or the intended operation, and the one or more movements to represent one or more of the state or the intended operation.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 1 illustrates an example robotic system, according to an example implementation.

FIGS. 5A-5E illustrate another example scenario of robot to human feedback, according to an example implementation.

DETAILED DESCRIPTION

Figure 2B:
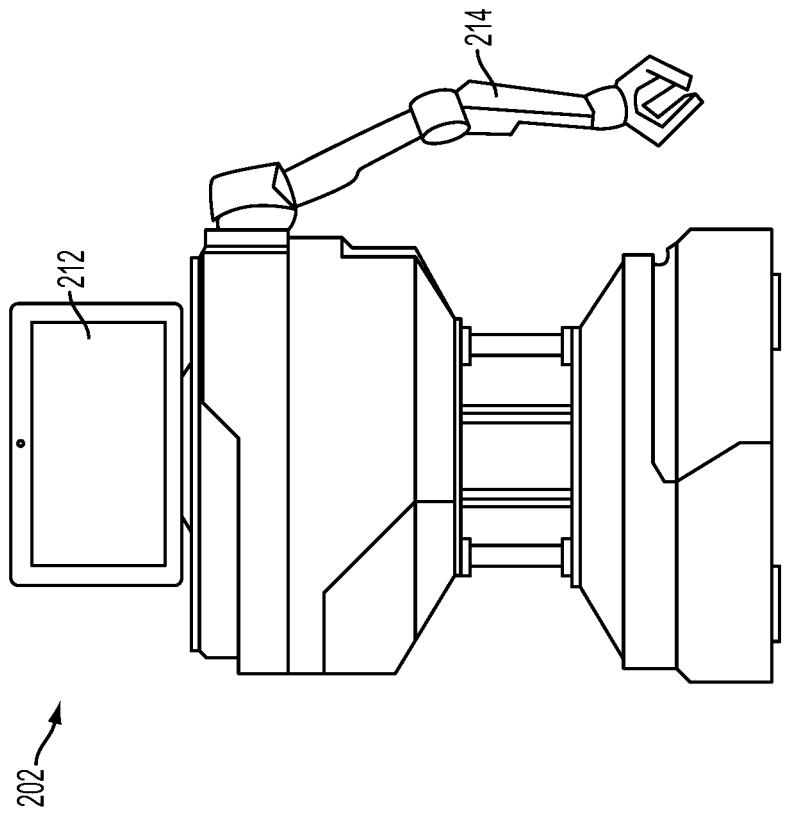
FIGS. 2A-2F illustrate graphical examples of a robot, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

According to various implementations, described herein are systems and methods involving a robotic system configured to provide feedback to humans. Generally, a robotic system can include a plurality of sensors that the robotic system may use to gather information (i.e., based on sensor data) about the environment in which the robotic system is operating. In particular, the robotic system can obtain the sensor data and interpret the data into an understanding of objects, human faces, and gestures, as well as various situations in the environment, among other possibilities.

The obtained information may influence a state of the robotic system (e.g., a current model or interpretation of the environment), intention (e.g., a planned behavior or action of the robotic system), and/or overall safety of interaction (e.g., caution while carrying out a task). The robotic system may then use various modes to convey the state, intention, and overall safety of interaction. In this manner, the robotic system may provide feedback about a task and progress of the task as well as about safety concerns associated with the task and/or the environment.

II. EXAMPLE ROBOTIC SYSTEMS

Referring now to the figures, FIG. 1 illustrates an example robotic system 100. A robotic system 100 may include any computing device(s) that have an actuation capability (e.g., electromechanical capabilities). In particular, the robotic system 100 may contain computer hardware, such as a processor 102, memory or storage 104, sensors 106, and mechanical actuators 108. For example, a robot controller (e.g., processor 102, a computing system, and sensors 106) may be custom designed for the robotic system 100. Note that the robotic system may also be referred to as a robotic device, a robot client, and a robot, among other possibilities.

In an example implementation, the storage 104 may be used for compiling data from various sensors 106 of the robotic system 100 and storing program instructions. The processor 102 may be coupled to the storage 104 and may be configured to control the robotic system 100 based on the program instructions. The processor 102 may also be able to interpret data from the various sensors 106 on the robotic system 100.

Example sensors 106 may include a gyroscope or an accelerometer to measure movement of the robot system. The sensors 106 may also include any of Global Positioning System (GPS) receivers, sonar, optical sensors, biosensors, Radio Frequency identification (RFID) systems, Near Field Communication (NFC) chip, wireless sensors, and/or compasses. Other sensors 106 may further include smoke sensors, light sensors, radio sensors, microphones, speakers, radar, capacitive sensors, touch sensors, cameras (e.g., color cameras, grayscale cameras, and/or infrared cameras), depth sensors (e.g., RGB-D, laser, structured-light, and/or a time-of-flight camera), motion detectors (e.g., an inertial measurement unit (IMU), and/or foot step or wheel odometry), and/or range sensors (e.g., ultrasonic and/or infrared), among others.

The robotic system 100 may also have components or devices that allow the robotic system 100 to interact with its environment (i.e., surroundings). For example, the robotic system 100 may have mechanical actuators 108, such as motors, wheels, movable arms, etc., that enable the robotic system 100 to move or interact with the environment in order to carry out various tasks.

In some examples, various sensors and devices on the robotic system 100 may be modules. Different modules may be added or removed from the robotic system 100 depending on requirements. For example, in a low power situation, the robotic system 100 may have fewer modules to reduce power usages. However, additional sensors may be added as needed. To increase an amount of data the robotic system 100 may be able to collect, additional sensors may be added, for example. Note that any of the modules may be interconnected, and/or may communicate to receive data or instructions from each other so as to provide a specific output or functionality for the robotic system 100.

In some implementations, the robotic system 100 may have a link by which the link can access cloud servers, communicate with other robotic systems, and/or communicate with other computing devices. A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, the robotic system 100 may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The robotic system 100 may take on various forms. To illustrate, consider FIGS. 2A-2F showing example robots 200-210 (e.g., as conceptual graphical representations) that may operate as robotic system 100 discussed above. In particular, any of the robots 200-210 may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

Robots 200 and 208 are shown as a mechanical form of a person including arms, legs, and a head. Whereas, robots 202, 204, 206, and 210 include mechanical actuators comprising a base, wheels, and/or a motor. However, example robots 200-210 may take on any other form and may be configured to receive any number of modules or components which may be configured to operate the robot.

In an example implementation, robots 200-210 may obtain data from one or more sensors 106. For example, a robot may take a picture of an object and upload the picture to storage 104. An object recognition program used by the processor 102 may be configured to identify the object in the picture and provide data about the recognized object, as well as possibly about other characteristics (e.g., metadata) of the recognized object, such as a location, size, weight, color, etc.

In particular, robots 200-210 may include, store, or provide access to a database of information (e.g., as part of storage 104) related to objects. The database may include information identifying objects, and details of the objects (e.g., mass, properties, shape, instructions for use, etc., any detail that may be associated with the object) that can be accessed by the robots 200-210 to perform object recognition (or facial recognition during interaction with humans). As an example, information regarding use of an object can include, e.g., for a phone, how to pick up a handset, how to answer the phone, location of buttons, how to dial, etc.

In addition, the database may include information about objects (or humans) that can be used to distinguish objects (or humans). For example, the database may include general information regarding an object (e.g., such as a computer), and additionally, information regarding a specific computer (e.g., a model number, details or technical specifications of a specific model, etc.). Each object may include information in the database including an object name, object details, object distinguishing characteristics, etc., or a tuple space for objects that can be accessed. Each object may further include information in the database in an ordered list, for example.

In further examples, the database may include a global unique identifier (GUID) for objects (or humans) identified in the database (e.g., to enable distinguishing between specific objects/humans), and the GUID may be associated with any characteristics or information describing the object. Thus, a robot may be configured to access the database to receive information generally distinguishing objects (e.g., a baseball vs. a computer), and to receive information that may distinguish between specific objects (e.g., two different computers). Other examples may also be possible.

The robots 200-210 may perform any number of actions within an area, with people, with other robots, etc. In one example, each robot has WiFi or another network based connectivity and may communicate with other robots directly or may upload/publish data to a cloud service that can then be shared with any other robot. In this manner, the robots 200-210 may share experiences with each other to enable learned behaviors. For instance, the robot 204 may traverse a pathway and encounter an obstacle, and can inform the other robots of a location of the obstacle. In another instance, the robot 204 can download data indicating images seen by the other robots to help the robot 204 identify an object using various views (e.g., in instances in which one or more of the other robots have captured images of the objects from a different perspective).

In still another example, the robot 208 may build a map of an area, and the robot 204 can download the map to have knowledge of the area. Similarly, the robot 206 could update the map created by the robot 208 with new information about the area (e.g., the hallway now has boxes or other obstacles), or with new information collected from sensors that the robot 208 may not have had (e.g., the robot 206 may record and add temperature data to the map if the robot 408 did not have a temperature sensor). Overall, the robots 200-210 may be configured to share data that is collected to enable faster adaptation, such that each robot can build upon a learned experience of a previous robot.

Sharing and adaptation capabilities enable a variety of applications based on a variety of inputs/data received from the robots 200-210. In a specific example, mapping of a physical location, such as providing data regarding a history of where a robot has been, can be provided. Another number or type of indicators may be recorded to facilitate mapping/navigational functionality of the robots 200-210 (e.g., a scuff mark on a wall can be one of many cues that a robot may record and then rely upon later to orient itself).

In an example implementation, a robot may include an integrated user-interface (UI) that allows a user to interact with the device. For example, robots 200-210 may include various buttons and/or a touchscreen interface that allow a user to provide input. As another example, the robots 200-210 may include a microphone configured to receive voice commands from a user. Furthermore, the robots 200-210 may include one or more interfaces that allow various types of user-interface devices to be connected to the robot.

To illustrate, consider example robot 202 shown in FIG. 2B. The robot 202 includes an on-board computing system, device 212, mechanical actuator 214, and one or more sensors. In some examples, the robot 202 may be configured to receive the device 212 that includes the processor 102, the storage 104, and the sensors 106. For instance, the robot 202 may be a robot that has a number of mechanical actuators (e.g., a movable base), and the robot may be configured to receive a mobile telephone, smartphone, tablet computer, etc. to function as the "brains" or control components of the robot. The device 212 may be considered a module of the robot. The device 212 may be physically attached to the robot. For example, a smartphone may sit on a robot's "chest" and form an interactive display. The device 212 may provide a robot with sensors, a wireless link, and processing capabilities, for example.

In particular, the robot 202 may be a toy with only limited mechanical functionality, and by connecting device 212 to the robot 202, the robot 202 may now be capable of performing a number of functions with the aid of the device 212. In this manner, the robot 202 (or components of a robot) can be attached to, for instance, a mobile phone to transform the mobile phone into a robot (e.g., with legs/arms) that is connected to a server to cause operation/functions of the robot.

In some examples, the device 212 may not be physically attached to the robot 202, but may be coupled to the robot 202 wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robot 202 may include mechanical robot features, and may be configured to receive the device 212 (e.g., a mobile phone, smartphone, tablet computer, etc.), which can provide additional peripheral components to the robot 202, such as any of an accelerometer, gyroscope, compass, GPS, camera, WiFi connection, a touch screen, etc., that are included within the device 212.

III. EXAMPLE ROBOT TO HUMAN FEEDBACK

Figure 2A:
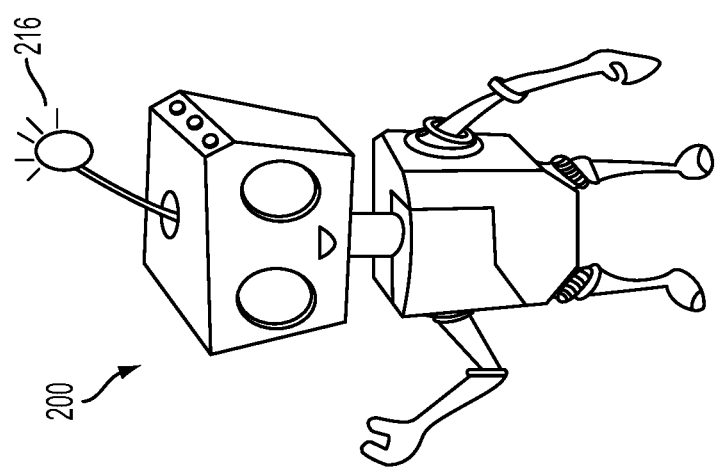
Figure 2C:
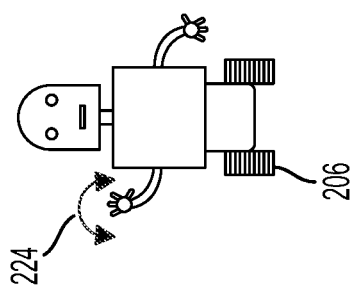
Figure 2D:
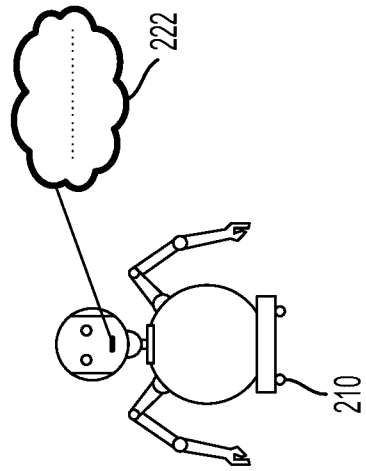
Figure 2E:
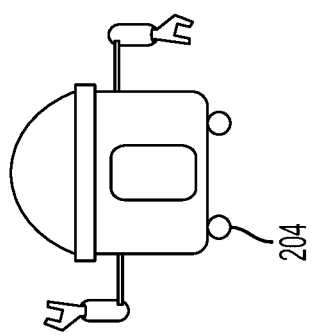
Figure 2F:
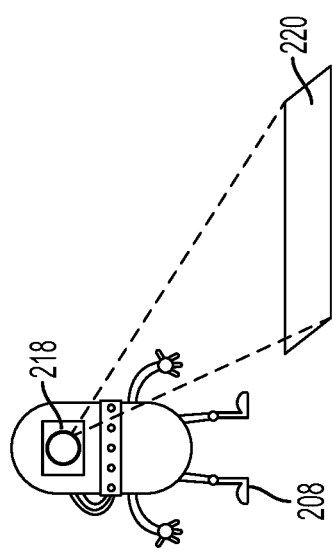
Figure 3:
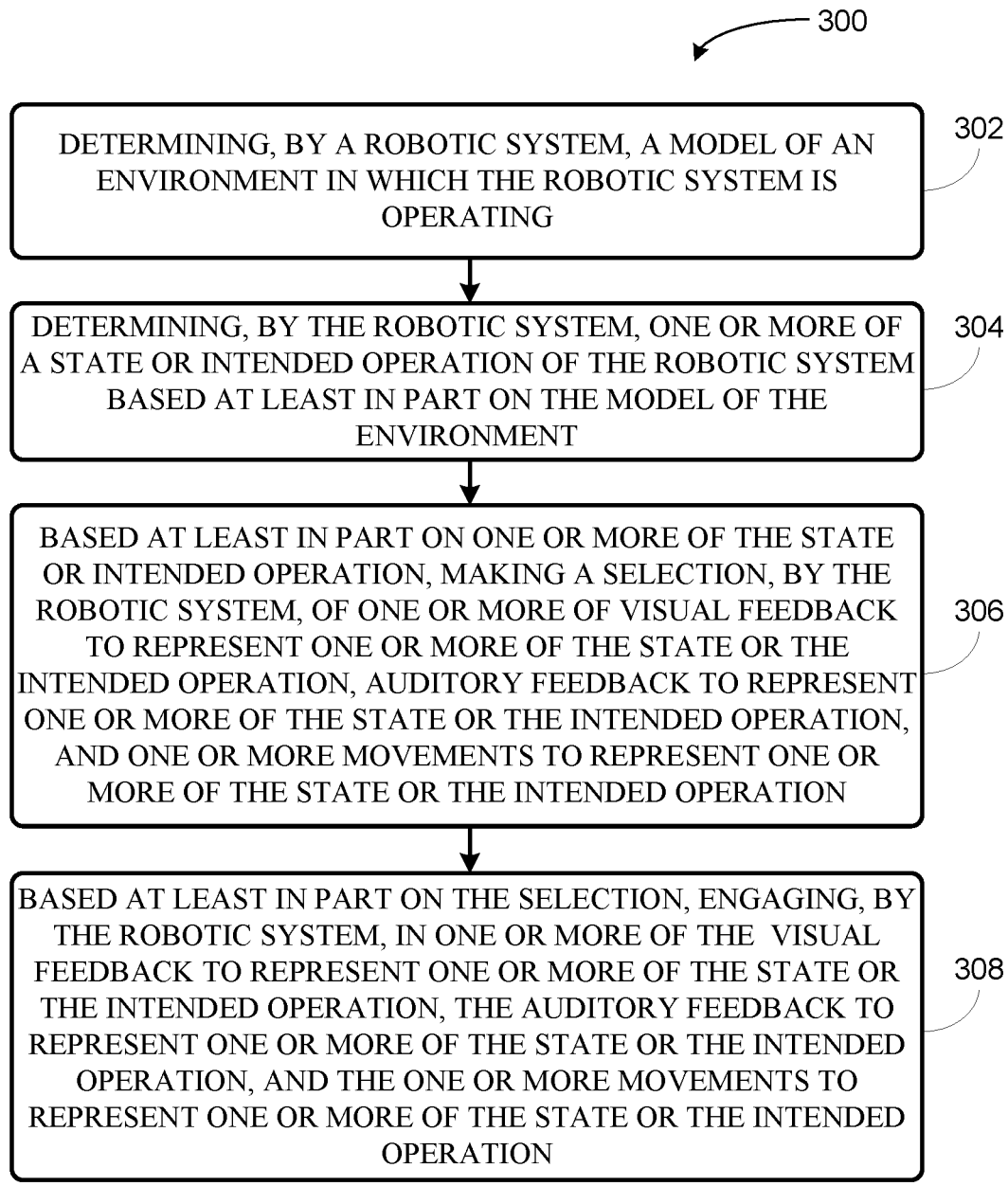
FIG. 3 is a flowchart illustrating a method for robot to human feedback, according to an example implementation.

FIG. 3 is a flowchart illustrating a method 300, according to an example implementation. Illustrative methods, such as method 300, may be carried out in whole or in part by a component or components in a robotic system, such as by the one or more of the components of the robotic system 100 shown in FIG. 1, and/or by the one or more of the components of the robots 200-210 shown in FIGS. 2A-2F. However, it should be understood that example methods, such as method 300, may be carried out by other entities or combinations of entities (i.e., by other computing devices and/or combinations of computing devices), without departing from the scope of the invention.

As shown by block 302, method 300 involves determining, by a robotic system, a model of an environment in which the robotic system is operating.

In one aspect, determining a model of the environment in which the robotic system is operating (i.e., evaluating surroundings of the robotic system) may involve receiving sensor data from one or more sensors (e.g., sensors 106) associated with the robotic system. Such sensor data may include: image data, sound data, temperature data, depth data, proximity data, motion data, speech recognition data, facial recognition data, and/or location data, among other possibilities.

Given the sensor data, the robotic system may interpret the data into an understanding of objects, human faces, and gestures, as well as various situations in the environment. Additionally, the robotic system may be able to interpret how carrying out the task (or other interactions) may impact the environment (e.g., objects and/or humans in the environment) in which the robotic system is operating. As a result, such an interpretation of the obtained sensor data may influence a state of the robotic system (e.g., a current model or interpretation of the environment), intention (e.g., a planned behavior or action of the robotic system), and/or overall safety of interaction (e.g., caution while carrying out a task).

In an additional aspect, the robotic system may be configured to engage in one or more feedback modes as a result of the robotic system's interaction with the environment. Such feedback modes may be used to portray the state of the robotic system, a future intended action of the robotic system, and/or provide information (e.g., a warning) to a human, among other options. In one case, the robotic system may operate using one or more visual indicators (e.g., light) such as LEDs or projectors, among other possibilities. This may specifically involve using one or more light sources to emit light having particular light characteristics. For instance, as illustrated in FIG. 2A, a robot 200 may include a visual indicator 216 (e.g., in the form of a light bulb or an LED) configured to emit light (as illustrated by the short lines in the figure) to provide feedback to a human. In another instance, as illustrated in FIG. 2E, robot 208 may include a projector 218 configured to emit a projection 220 onto a surface that provides feedback to a human (e.g., in the form of an image). Other instances may also be possible.

Visual indicators may provide feedback in various ways. For example, color or brightness of an LED may indicate a potential warning to a human. As further discussed below, this may be used in a situation when the robotic system is aware of proximity of the human to the robotic system while the robotic system is carrying out a task. In another example, the robotic system may project lights of varying colors that indicate an intended direction of motion and/or a gaze direction of the robotic system. In this example, the projection may indicate an object the robotic system is analyzing and/or may indicate an object that the robotic system intends to grasp or otherwise manipulate. Other examples may also be possible.

In another case, the robotic system may operate using auditory indicators such as various sounds emitted from one or more speakers. For instance, as illustrated in FIG. 2F, a robot 210 may emit sounds that provide auditory feedback, such as by operating an auditory indicator 222 (e.g., a speaker positioned in the head of robot 210). In one example, the sounds may include noises used as warning signs during a potentially dangerous situation. In another example, the sounds may include commands that can be used as requests from a robotic system to a human (e.g., requesting that the human move away from an intended path of the robotic system). In yet another example, the sounds may include statements used as indicators of a current task the robotic system is performing (e.g., a robotic system picking up an object may be programmed to provide an auditory statement such as "I am picking up an object"). Other examples may also be possible.

In yet another case, the robotic system may use movement as a mode to provide feedback to humans. For example, a robotic system (e.g., a humanoid robot) may use a robotic arm to portray various gestures to a human. For instance, as illustrated in FIG. 2D, a robot 206 may use a hand gesture 224 by moving the robotic arm side to side (i.e., "waving"), such as to attract attention of a human in the environment. Others gestures may include: pointing in the direction of a potentially dangerous situation, moving a robot head side to side to indicate a "no" gesture or move the robot head up and down to indicate a "yes" gesture, and/or using the robotic arm for a "thumbs up" or a "thumbs down" gesture, among others. In another example, as further discussed below, the robotic system may move to another position in order to maximize safety of the human, such as repositioning between a human and a fire hazard. Other examples may also be possible.

In some cases, a robotic system may provide feedback to a human by interacting with devices (e.g., via a wireless link as discussed above), such as a laptop or a smartphone associated with the human. Consider a scenario where a robotic system is looking for an object and is unable to find the object. The robotic system may need assistance in finding the object but may recognize that the human is partaking in a conversation. Upon recognizing the situation, the robotic system may determine that using visual and auditory indicators may interrupt the human's conversation. As such, the robotic system may choose to request assistance by sending a notification (e.g., SMS) to the human's mobile device. Other cases may also be possible.

In an example implementation, the robotic system may use multiple modes for feedback simultaneously. For example, in a scenario where the robotic system is trying to attract attention of a human, the robotic system can simultaneously provide gestures (e.g., waving the robotic arm) and auditory signals such as lights. In particular, different combinations of feedback may indicate different states of the robotic system. For example, a waving motion combined with a red light output may provide an indication that the robotic system is in an emergency situation. In contrast, a waving motion combined with a green light output may provide an indication that the robotic system is trying to attract attention of a human in a non-emergency situation. Other examples may also be possible.

Note that such light indicators may be placed on a robot head (e.g., as shown in FIG. 2A), among other possible locations. The head may also include speakers, microphones, and/or panels. In some implementations, the head of the robotic system may include a tablet (e.g., device 212 in FIG. 2B) used to portray expressions, lights, and/or a task status (i.e., progress), among others. Additionally, the tablet may display a video feed showing the environment from the perspective of the robotic system.

As shown by block 304, method 300 involves determining, by the robotic system, one or more of a state or intended operation of the robotic system based at least in part on the model of the environment.

Given a model of the environment, the robotic system may determine a state of the robotic system, such as progress of completing a task or a certain determination for instance. Additionally or alternatively, the robotic system may determine an intended operation, such as a planned task or planned trajectory for movement of an object for instance. In some cases, this may involve determining a performance metric based at least in part on the model of the environment, such as a performance metric that may be associated with a level of risk of carrying out a task in the environment or may be associated with a level of risk of a situation interpreted from the model of the environment, among others.

In an example implementation, determining a performance metric that is associated with a level of risk (or safety/concern) of a situation in the environment and/or a task that the robotic system is carrying out in the environment could be done in various ways. For example, the robotic system may process obtained sensor data from various sensors and may interpret the data to determine the performance metric. Note that the performance metric may be in the form a number or other possible values/indicators interpretable by a processor of the robotic system. Additionally, note that a level of safety may correspond to safety of the robotic system during the state/intended operation of the robotic system, safety of a human in the environment during the state/intended operation of the robotic system, and/or safety of an object in the environment during the state/intended operation of the robotic system, among others.

More specifically, varying data from a given sensor may result in varying values for a performance metric. In other words, specific data from specific sensors may include a corresponding performance metric stored in a database (e.g., storage 104). However, in some implementation, the performance metrics may update over time based on learned experiences of the robotic system.

Various cases will now be introduced to illustrate how a performance metric may be determined from obtained sensor data. Note that the cases are discussed for illustration purposes and are not meant to be limiting as other example cases may also be possible without departing from the scope of the invention. Additionally, note that data from each sensor may result in a different performance metric and the various performance metric may then be combined in any manner (e.g., each may be weighted differently) to result in an overall performance metric representing a level of risk in the environment (and/or of a task).

In one case, temperature data indicating a high temperature, such as 130° F., may correspond with a high value performance metric (e.g., a 9 on a scale of 10). In particular, such a high value performance metric may correspond with a high level of risk/concern (or a low level of safety) because such a high temperature may be harmful to components of the robotic system and/or to a human in the environment. In contrast, temperature data indicating an average temperature, such as 70° F., may correspond with a low value performance metric (e.g., a 1 on a scale of 10). In particular, such a low value performance metric may correspond with a low level of risk/concern (or a high level of safety) because such an average temperature may not be harmful to components of the robotic system and/or to a human in the environment.

In another case, image data may be processed by the robotic system and various image matching techniques may be used to interpret the environment. Various images may be stored in a database of the robotic system (or on a cloud-based service) and each image may correspond to a performance metric. For example, if the robotic system interprets image data that indicates a sharp object, such image data may correspond with a high value performance metric (i.e., high level of risk/concern) because the sharp object may be harmful to a human in the environment. In contrast, if the robotic system interprets image data that indicates a round object, such image data may correspond with a low value performance metric (i.e., low level of risk/concern) because the round object may not be harmful to a human in the environment.

In yet another case, proximity data may be used to indicate a distance between the robotic system and a human while the robotic system is carrying out a dangerous task. For example, the robotic system may determine a distance of 1 meter. Such a distance may correspond with a high value performance metric (i.e., high level of risk/concern) because the distance may put the human in a dangerous position (e.g., due to a potential collision with the robotic system). However, if the same distance (i.e., 1 meter) is determined while the robotic system is carrying out a non-dangerous task, the distance may correspond to a lower value performance metric. In contrast, the robotic system may determine a distance of 10 meters. Such a distance may correspond with a low value performance metric (i.e., low level of risk/concern) because the distance may put the human in a non-dangerous position (e.g., no potential for collision with the robotic system).

In yet another case, location data may be used to indicate whether a current location of the robotic system corresponds to a safe location. For example, the robotic system may determine that a current location corresponds to a home of the user of the robotic system. Such a location may correspond with a low value performance metric (i.e., low level of risk/concern) because the robotic system may be preconfigured to determine that the home corresponds to a safe location for the robotic system and the user. In contrast, the robotic system may determine that a current location corresponds to remote unknown location. Such a location may correspond with an average value performance metric (i.e., average level of risk/concern) because the robotic system may be preconfigured to determine that a remote unknown location may correspond to an unsafe location for the robotic system. Other cases may also be possible.

As shown by block 306, method 300 involves, based at least in part on one or more of the state or the intended operation, making a selection, by the robotic system, of one or more of visual feedback to represent one or more of the state or the intended operation, auditory feedback to represent one or more of the state or the intended operation, and one or more movements to represent one or more of the state or the intended operation.

Upon determining the state/intended operation based on the model of the environment, the robotic system may select an operating mode based on the state/intended operation. The operating mode may include one of the feedback modes discussed above such as a visual indicator, an auditory indicator, a gesture, and/or a notification to a computing device. Additionally or alternatively, the operating mode may include one or more movements. In one example, the one or more movements may involve repositioning of the robotic system from a first location to a second location (e.g., to avoid a collision with a human). In another example, the one or more movement may involve repositioning of an object from a first location to a second location (e.g., if the object is positioned in a location that is dangerous to the human). Other examples may also be possible.

Note that, in some implementations, the one or more movements may essentially provide feedback and may thus be considered as a feedback mode. However, in other implementations, the one or more movements may be considered as separate from the feedback modes. For instance, various feedback modes (e.g., visual or auditory) may be used to provide a warning to a human while the one or more movements may be used as preventative actions by the robot (e.g., avoiding a collision) if the warning was not sufficient.

In an example implementation, each determined performance metric may have a corresponding operating mode indicated in the database (e.g., in storage 104 or in a cloud-based service). Upon determining the performance metric, processor 102 may select the corresponding operating mode. For example, the robotic system may determine a high level performance metric (i.e., a high level of risk) with a value of 8 on a scale of 10. Subsequently, the robotic system may determine that the operating mode corresponding to such a high level performance metric includes simultaneous operation of a visual indicator (e.g., a red light) and an auditory indicator (e.g., a warning command). In another example, the robotic system may determine a low level performance metric (i.e., a low level of risk) with a value of 2 on a scale of 10. Subsequently, the robotic system may determine that the operating mode corresponding to such a low level performance metric includes operation of a visual indicator (e.g., a green light). Other examples may also be possible.

In a further aspect, determining the performance metric may also include an evaluation of the context of a situation in the environment (or a task carried out in the environment). As a result, selecting an operating mode may also involve a consideration of the context in addition to a value (i.e., level) of the performance metric that is associated with the level of risk. In particular, different situations (or tasks) in the environment may result in the same determined value for the performance metric. However, different operating modes may be appropriate for different situations.

For example, a robotic system may determine a gaze direction of a human (e.g., using facial recognition techniques) during a dangerous situation. In particular, the robotic system may determine that the dangerous situation corresponds to a high level performance metric (i.e., a high level of risk). However, if the robotic system determines that the gaze direction of the human is in the direction of the robotic system (i.e., a first context), the robotic system may select an operating mode that includes, for instance, operation of a visual indicator (e.g., blinking red lights) as well as a gesture. This may be due to stored information indicating that a gaze direction in the direction of the robotic system may allow the human to see the warning from the robotic system in the form of light or gestures.

Whereas, if the robotic system determines that the gaze direction of the human is away from the location of the robotic system (i.e., a second context), the robotic system may select an operating mode that includes, for instance, operation of an auditory indicator (e.g., a siren) as well as a notification to a computing device. This may be due to stored information indicating that a gaze direction away from the location of the robotic system may not allow the human to see a visual warning from the robotic system and may thus require a different warning to get the attention of the human. Other examples may also be possible.

In this manner, the database of the robotic system may include, for instance, a listing of various contexts for different possible situations (or tasks) in the environment and each situation may include varying levels of risk/concern/safety. As a result, the performance metric may be determined to include a context of a situation as well as a level of risk associated with the situation and the robotic system may subsequently query the database to select the appropriate operating mode corresponding to the determined performance metric.

As shown by block 308, method 300 involves, based at least in part on the selection, engaging, by the robotic system, in one or more of the visual feedback to represent one or more of the state or the intended operation, the auditory feedback to represent one or more of the state or the intended operation, and the one or more movements to represent one or more of the state or the intended operation.

Various example scenarios will now be introduced to illustrate how method 300 may be used. Note that the scenarios are discussed for illustration purposes and are not meant to be limiting as other example scenarios may also be possible without departing from the scope of the invention.

Figure 4A:
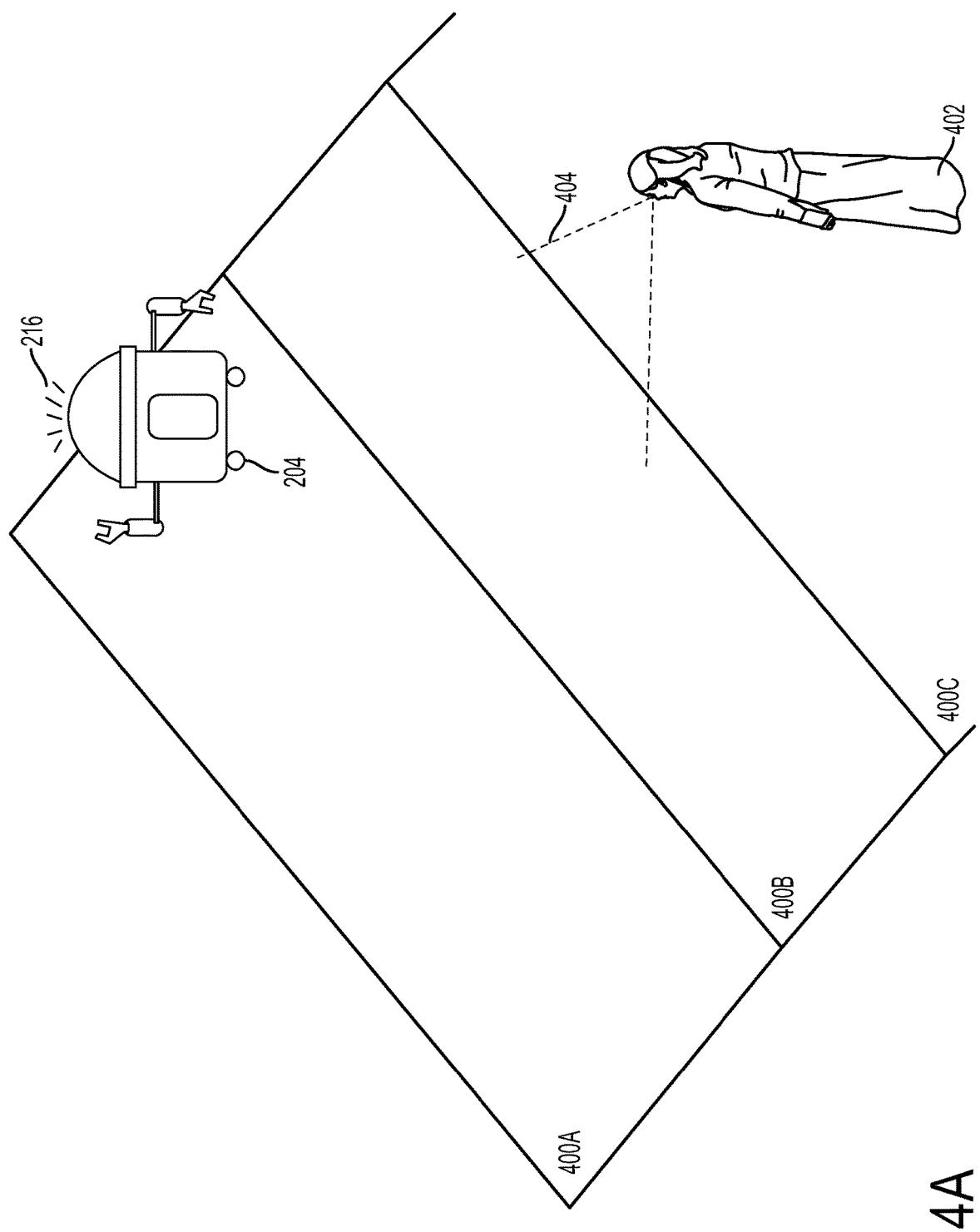
FIGS. 4A-4D illustrate an example scenario of robot to human feedback, according to an example implementation.

FIG. 4A illustrates robot 204 operating in an environment as well as a human 402 positioned in the vicinity of the robot 204 (e.g., within a threshold distance). Additionally, FIG. 4A illustrates regions 400A-400C. Region 400A may be an area where the robot 204 is carrying out a dangerous task and may be unsafe (i.e., a low level of safety) for the human 402. Region 400B may be adjacent to region 400A and may correspond with an average level of safety for the human 402. In contrast, region 400C may be a sufficient distance away from region 400A and may be safe (i.e., a high level of safety) for the human 402.

In an example implementation, the robot 204 may be configured to predict one or more actions by the human 402. The robot 204 may then also determine the performance metric based on the predicted action (e.g., in addition to the possible factors discussed above). For instance, the robot 204 may determine a gaze direction 404 of the human 402. Based on the gaze direction 404, the robot 204 may predict that the human 402 is walking in the direction of region 400A and may determine a performance metric based on the prediction. In order to warn the human 402, the robot 204 may operate in a feedback mode that is selected based on the performance metric. For example, as illustrated in FIG. 4A, the robot may operate a visual indicator 216 (e.g., a green light) while the human 402 is positioned in region 400C (i.e., a safe region).

In an additional aspect, the robot 204 may be configured to evaluate one or more actions by the human 402. The robot 204 may then also determine the performance metric based on the evaluated action (e.g., in addition to the possible factors discussed above). For instance, as illustrate in FIG. 4B, the robot 204 may evaluate that the human 402 moved from region 400C to region 400B. Based on such an evaluation, the robot 204 may determine that the performance metric changed from a value corresponding to a high level safety to a value corresponding to an average level of safety.

Figure 4B:
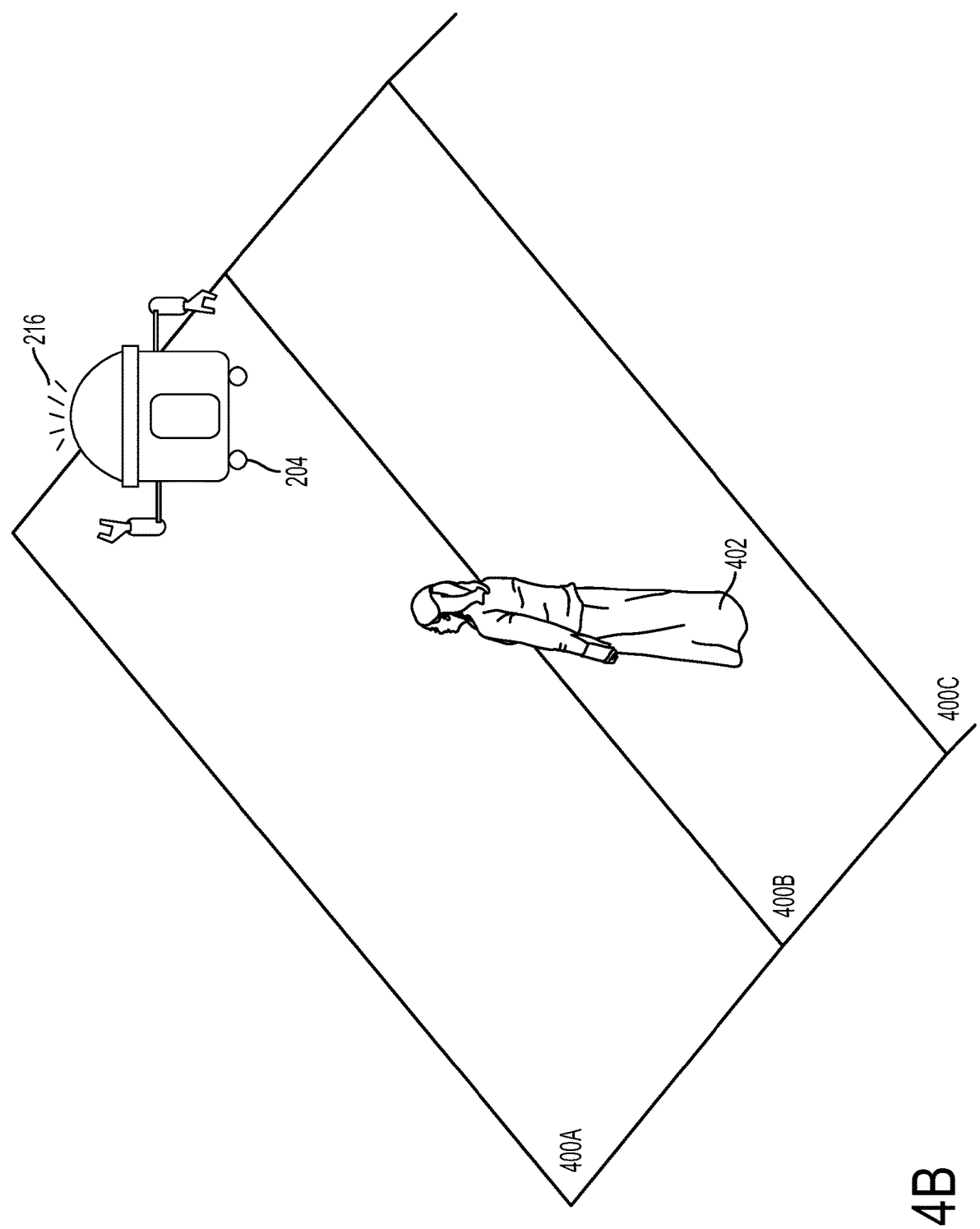
Figure 4C:
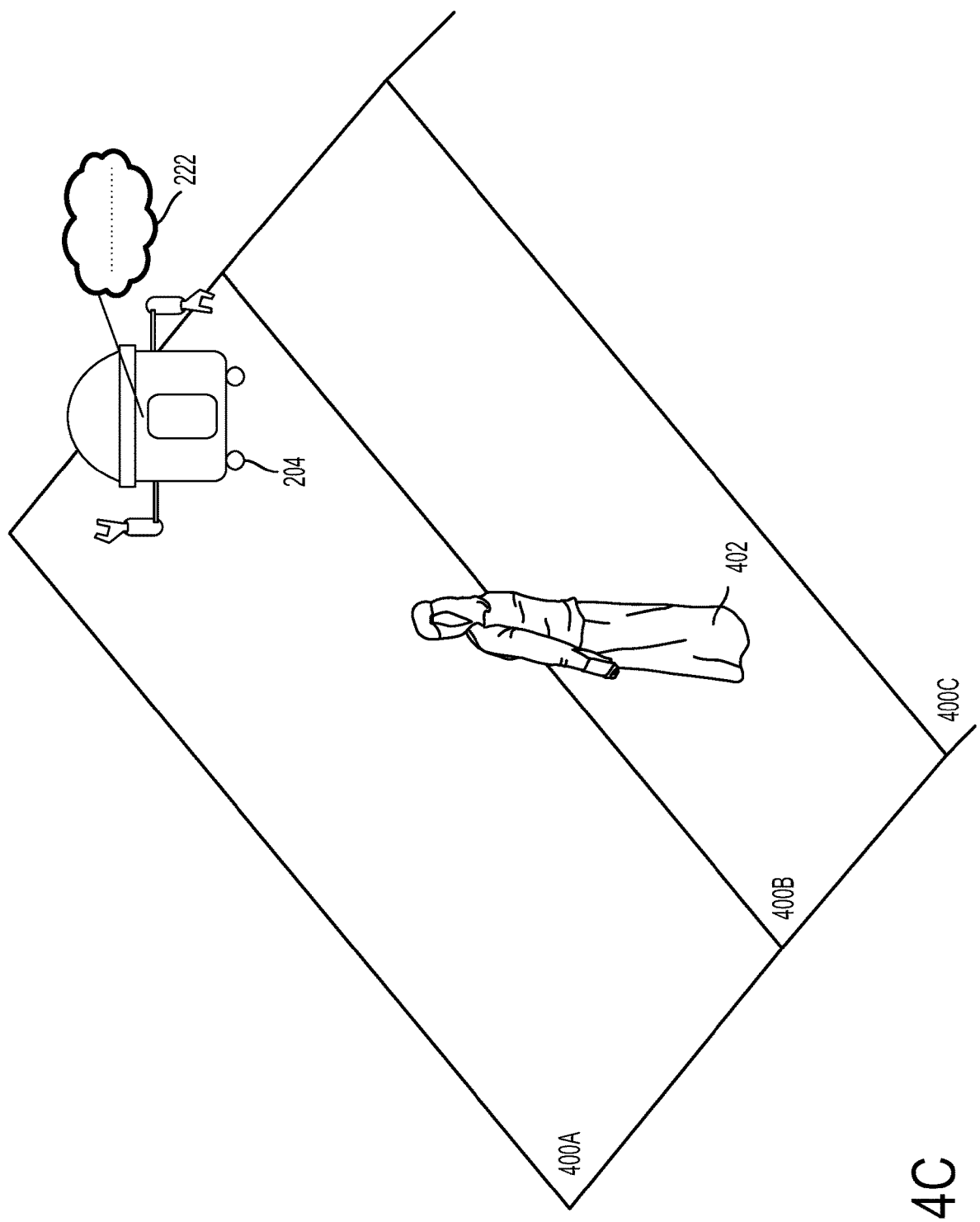

Due to the change in the level of safety, the robot 204 may change the feedback mode. For example, as illustrated in FIG. 4C, the robot 204 may change from operating a visual indicator 216 to operating an auditory indicator 222 (e.g., the robot may emit auditory feedback indicating "warning! I am carrying out a dangerous task!"). As shown in FIG. 4C, such an auditory indicator 222 may get the attention of the human 402 and may allow the human 402 to take further action such as to avoid entering region 400A based on knowledge of the situation received from the auditory indicator 222.

Consider a situation where human 402 moves from region 400B to 400A (e.g., regardless of the previous warnings). The robot 204 may evaluate that the human 402 moved from region 400B to region 400A. Based on such an evaluation, the robot 204 may determine that the performance metric changed from a value corresponding to an average level of safety to a value corresponding to a low level of safety.

Figure 4D:
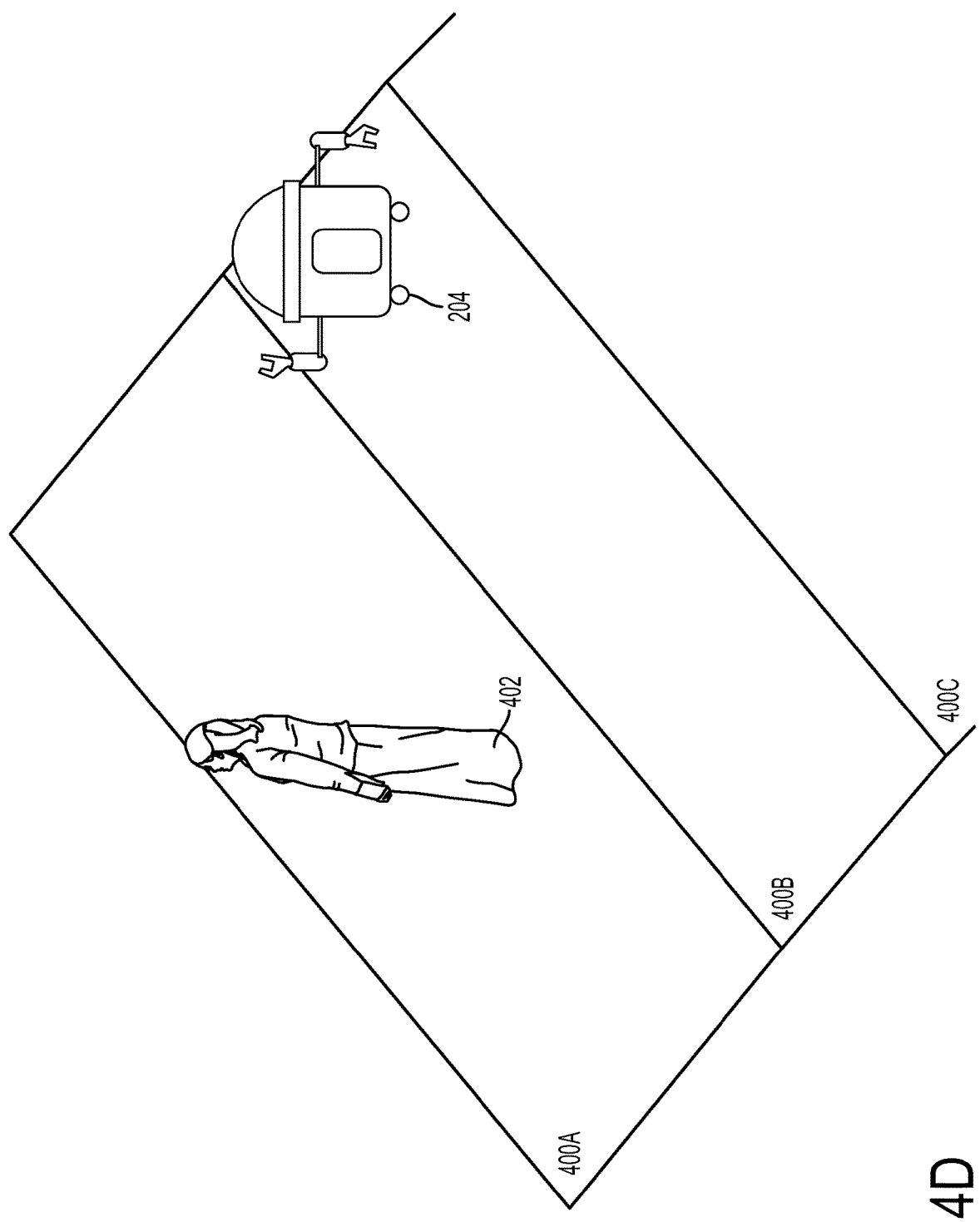

Due to the change in the level of safety, the robot 204 may change the operating mode. In one example, the robot 204 may engage in a different feedback mode, such as operating a visual indicator 216 (e.g., a blinking red light) while simultaneously operating an auditory indicator 222 (e.g., a loud siren). In another example, as illustrated in FIG. 4D, the robot 204 may engage in one or more movement such as relocating from a first location to a second location. For instance, as shown in FIG. 4D, robot 204 may relocate from region 400A to region 400B and may continue carrying out the dangerous task in region 400B. Due to the robot 204 relocating from region 400A to region 400B, region 400B may now be unsafe (i.e., a low level of safety) for the human 402 while region 400A may now correspond with an average level of safety for the human 402.

In this manner, a robotic system may determine a performance metric based on a model of the environment, where the performance metric may be associated with a first level of safety (or risk/concern) of carrying out a task in the environment and/or of a situation in the environment. The robotic system may then determine that the first level of safety is above a threshold level of safety. Such a threshold level of safety may involve, for instance, crossing from region 400C to region 400B while the first level of safety may involve, for instance, the human 402 positioned in region 400C (i.e., a region safer than region 400B). As such, based on determining that the first level of safety is above the threshold level of safety, the robotic system may engage in a first feedback mode (e.g., operating the visual indicator 216 as show in in FIG. 4A).

In some cases, the robotic system may determine that the first level of safety changed to a second level of safety, where the second level of safety is below the threshold level of safety. For instance, as shown in FIG. 4B, the human 402 may have crossed the threshold level of safety by moving from region 400C to region 400B and may now be positioned in region 400B (i.e., corresponding to a lower level of safety). As such, based on determining that the first level of safety changed to the second level of safety, the robotic system may engage in a second feedback mode (e.g., operating the auditory indicator 222 as show in in FIG. 4C).

In another case, the threshold level of safety may involve, for instance, crossing from region 400B to region 400A while the first level of safety may involve, for instance, the human 402 positioned in region 400B (i.e., a region safer than region 400A). Additionally, the second level of safety may involve the human 402 positioned in region 400A. As shown in FIG. 4D, the human 402 may have crossed the threshold level of safety by moving from region 400B to region 400A and may now be positioned in region 400A (i.e., corresponding to a lower level of safety). As such, based on determining that the first level of safety changed to the second level of safety, the robotic system may engage in one or more movement such that the level of safety is increased to a level that is above the threshold level of safety (e.g., as discussed above in association with FIG. 4D).

Note that, in some implementations, the robotic system may not consider thresholds as discussed above. For instance, if the selected operating mode includes the one or more movements, the robotic system may engage in the one or more movement such that a distance between the robotic system and an object changed from a first distance to a second distance, where the first distance may correspond to a first level of risk and the second distance may correspond to a second level of risk that is lower than the first level of risk. In this manner, the robotic system may reposition such that the first level of risk is reduced to the second level of risk without a consideration of thresholds. Other instances may also be possible.

FIG. 5A illustrates robot 204 operating in an environment as well as human 502 (e.g., an adult) positioned in the vicinity of the robot 204. Additionally, FIG. 5A illustrates a sharp object 504 in the environment as well as an intended path 506A of the human 502. As illustrated, the intended path 506A of the human 502 intersects with the sharp object 504. As such, if the human 502 continues moving in the direction of the intended path 506A, the human 502 may step on the sharp object 504 and may get hurt.

Robot 204 may evaluate the surroundings and use, for instance, object recognition techniques to determine that the object 504 is a sharp object. Additionally, the robot 204 may use proximity data to determine a distance between the robot 204 and the sharp object 504, a distance between the robot 204 and the human 502, and/or a distance between the human 502 and the sharp object 504. Further, the robot 204 may use facial recognition techniques to determine a gaze direction of the human 502 and estimate the intended path 506A of the human 502. Yet further, the robot 204 may use motion data to determine a speed at which the human 502 is moving.

Using this information the robot 204 may determine that the sharp object 504 is located in the intended path 506A of the human 502. Also, the robot 204 may use this information (e.g., the motion data) to determine an estimated time when the human 502 may step on the sharp object 504. Based on such information, the robot 204 may determine a model of the environment and then use the model to determine a performance metric associated with the level of risk of the situation. Given the performance metric, the robot 204 may then select an operating mode that may allow the robot 204 to warn the human 502 that the sharp object 504 is located in the intended path 506A of the human 502.

Figure 5B:
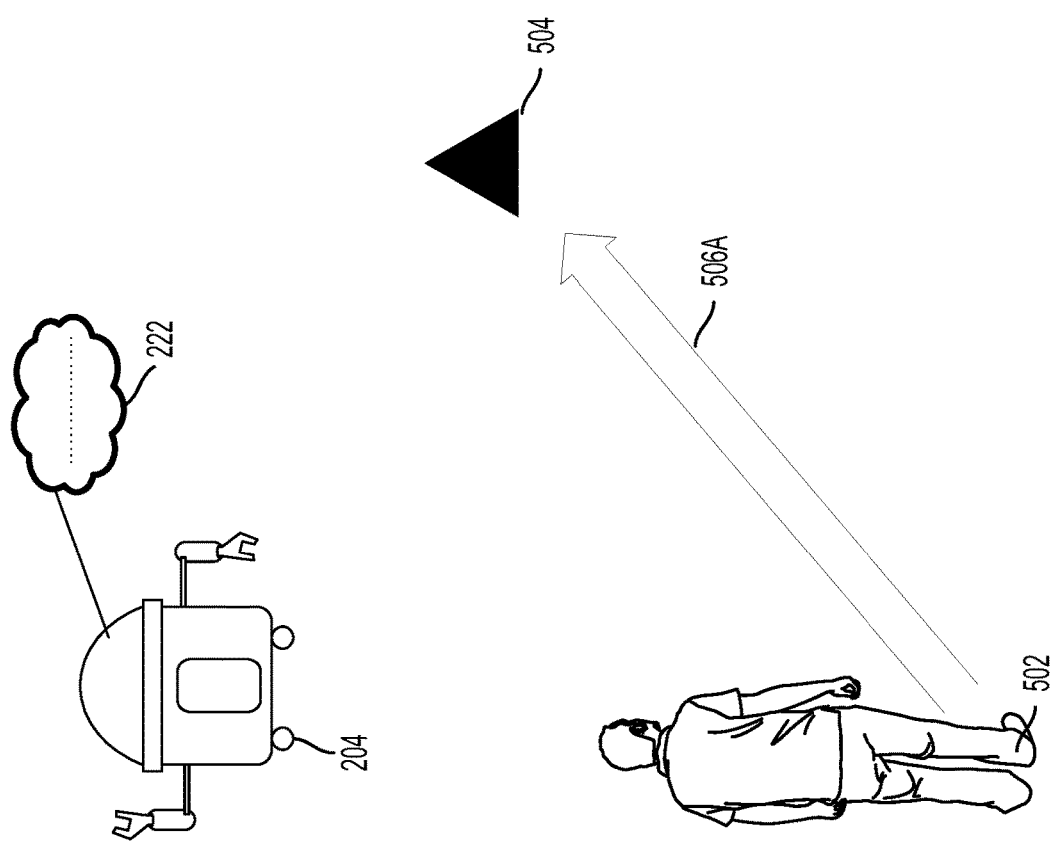

As illustrated in FIG. 5B, the robot 204 may select to operate an auditory indicator 222. The auditory indicator 222 may be, for example, a loud siren and/or a statement such as: "Beware! A sharp object is in your intended path!" In another example, the robot 204 may additionally operate a visual indicator such as by projecting a light in the direction of the sharp object 504 (e.g., as shown in FIG. 2E). In yet another example, the robot 204 may simultaneously operate an auditory indicator and a visual indicator, among other possible feedback modes.

In a further aspect, robot 204 may use various techniques such as speech recognition to determine, for instance, a language spoken by the human 502. If the robot 204 determines that the human 502 is an English speaking adult, the robot may use an auditory indicator 222 that includes a verbal warning in the English language. In contrast, if the robot 204 determines that the human 502 is a Spanish speaking adult, the robot 204 may use an auditory indicator 222 that includes a verbal warning in the Spanish language.

In an example implementation, if the human 502 continues walking in the intended path 506A, the robot 204 may determine that the performance metric changes to a metric associated with a higher level of risk as the distance between the human 502 and the sharp object 504 gets shorter. Based on the change in the performance metric, the robot 204 may select different operating modes as the human 502 gets closer to the sharp object 504 (e.g., in similar manner to the selection of operating modes discussed above in association with FIG. 4A-4D).

Figure 5C:
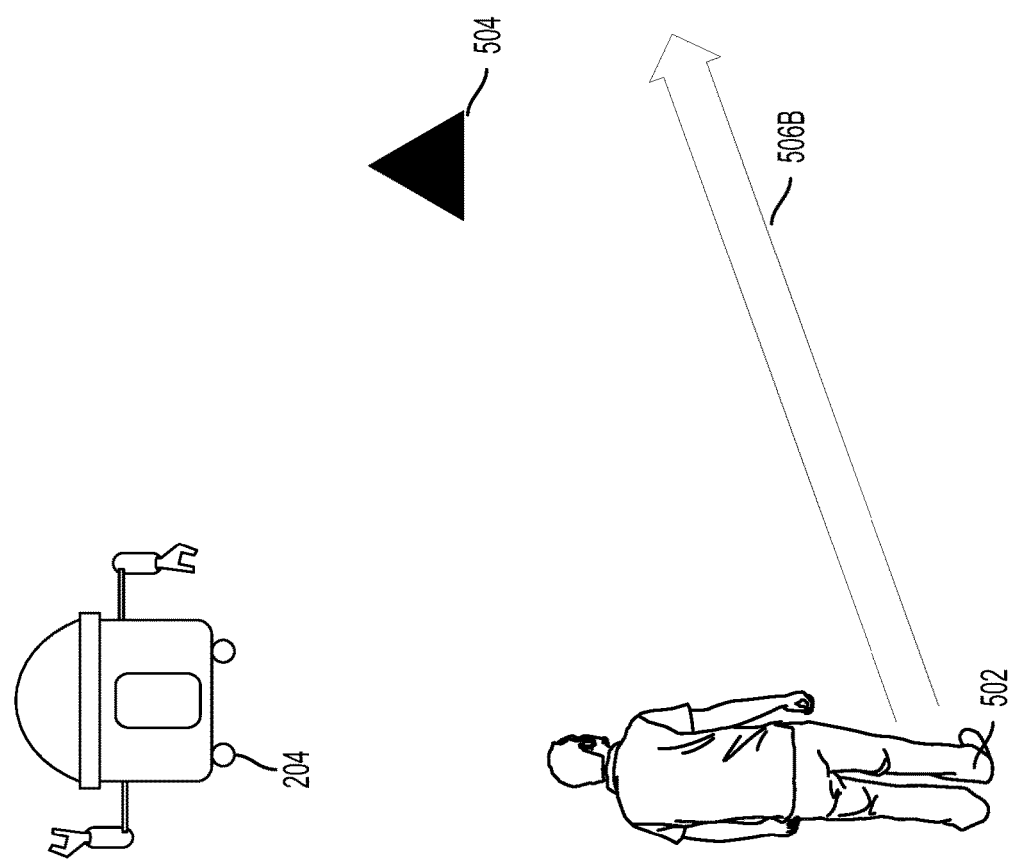

However, as illustrated in FIG. 5C, the robot 204 may determine that the intended path 506A of the human 502 changed to a different intended path 506B. The robot 204 can make such a determination based on, for instance, determining a change in the gaze direction of the human 502 and/or determining a change in the body orientation of the human 502 (e.g., using motion data), among other options. The robot 204 may then determine that the new intended path 506B does not intersect with the sharp object 504 (i.e., the object 504 is now located away from the intended path 506B).

Upon making such a determination, the performance metric may change to a metric associated with a lower level of risk and the robot 204 may halt engaging in the selected operating mode as illustrated in FIG. 5C. Alternatively, the robot 204 may select a different operating mode to indicate to the human 502 that the intended path 506B of the human 502 no longer intersects with the sharp object 504. For example, the robot 204 may operate an auditory indicator that includes a statement such as: "No worries! The sharp object is no longer in your intended path!"

In a similar manner to FIGS. 5A-5C, FIG. 5D illustrates robot 204 operating in an environment as well as a child 508 positioned in the vicinity of the robot 204. Additionally, FIG. 5D illustrates the sharp object 504 in the environment as well as an intended path 510A of the child 508. As illustrated, the intended path 510A of the child 508 intersects with the sharp object 504. As such, if the child 508 continues moving in the direction of the intended path 510A, the child 508 may step on the sharp object 504 and may get hurt.

Robot 204 may use, for instance, facial recognition techniques to determine (or estimate) an age of a human. A performance metric determined by the robot 204 may then also be based on the age of the human. In particular, as mentioned above, a performance metric may include a context of a situation. Such a context may be the age of the human, where interaction with the human may depend on the age of the human. As such, when selecting an operating mode, the robot 204 may be configured to select an operating mode that is appropriate based on the age of the human.

For example, FIGS. 5A-5C illustrated an interaction with an adult, where the robot 204 selected to operate an auditory indicator 222 to warn the adult about the sharp object 504. In contrast, as illustrated in FIG. 5E, the robot 204 may select an operating mode that includes one or more movements based on a determination that the human is a child 508. In particular, the robot 204 may reposition the sharp object 504 from a first location that is in the intended path 510A of the child 508 to a second location that is away from the intended path 510A of the child 508. In this manner, the level of risk of the child 508 getting hurt is reduced.

Note that the robot 204 may be configured to select such an operating mode because the child 508 may be very young (e.g., a 5 year old) and may not understand auditory feedback as well as an adult may understand the auditory feedback, among other possible reasons.

In yet another example scenario, the robotic system may determine an area of interest within the environment, such as a particular object for instance. Once the robotic system determine the area of interest, the robotic system may responsively determine that a task should be carried out related to this area of interest, such as grasping onto the object for instance. Then, once the robotic system determines the task, the robotic system may select a feedback mode such as by making a selection of visual feedback that includes projection of light from one or more light sources of the robotic system towards the area of interest. After the selection is made, the robotic system may then project the light from the one or more light sources of the robotic system towards the area of interest. Other example scenarios may also be possible.

IV. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

I claim:

1. A method comprising:
   determining, by a robotic system, a motion path of a user in an environment of the robotic system;
   based on the motion path of the user in the environment, determining, by the robotic system, a performance metric corresponding to a position of the user along the motion path;
   based on the determined performance metric, selecting, by the robotic system, a first feedback mode, wherein the first feedback mode comprises at least one indication to the user;
   engaging, by the robotic system, in the first feedback mode;
   determining a change in the performance metric based on a change in the position of the user;
   based on the determined change in the performance metric, selecting, by the robotic system, a second feedback mode, wherein the second feedback mode comprises at least one additional indication to the user different than the at least one indication of the first feedback mode; and
   engaging, by the robotic system, in the second feedback mode.

2. The method of claim 1, further comprising:
   based on the determined change in the performance metric, stopping the robot from engaging in the first feedback mode.

3. The method of claim 1, wherein the first feedback mode includes operation of a visual indicator.

4. The method of claim 3, wherein the visual indicator is a light generated by the robotic system.

5. The method of claim 3, wherein the visual indicator is a gesture performed by the robotic system.

6. The method of claim 1, wherein the first feedback mode includes operation of an auditory indicator.

7. The method of claim 6, wherein the auditory indicator comprises a siren.

8. The method of claim 1, wherein the first feedback mode further comprises a notification sent by the robotic system to a computing device.

9. The method of claim 1, wherein the robotic system comprises one or more appendages, and wherein engaging in the first feedback mode comprises carrying out one or more gestures using the one or more appendages.

10. The method of claim 1, wherein engaging in the first feedback mode comprises repositioning of the robotic system from a first location in the environment to a second location in the environment.

11. The method of claim 1, wherein engaging in the first feedback mode comprises the robotic system repositioning an object in the environment from a first location in the environment to a second location in the environment.

12. The method of claim 11, wherein the first location is in a path of the user, and wherein the second location is away from the path of the user.

13. The method of claim 1, wherein engaging in the first feedback mode comprises projecting light from one or more light sources of the robotic system towards an area of interest.

14. A robotic system comprising:
   one or more processors;
   a non-transitory computer readable medium; and
   program instructions stored on the non-transitory computer readable medium and executable by the one or more processors to:
   determine an intended path of a user in an environment of the robotic system;
   based on the intended path of the user in the environment, determine a performance metric corresponding to a position of the user along the intended path;
   based on the determined performance metric, select a first feedback mode, wherein the first feedback mode comprises at least one indication to the user;
   engage in the first feedback mode;
   determine a change in the performance metric based on a change in the position of the user;
   based on the determined change in the performance metric, select a second feedback mode, wherein the second feedback mode comprises at least one additional indication to the user different than the at least one indication of the first feedback mode; and
   engage in the second feedback mode.

15. The robotic system of claim 14, wherein the first and second feedback modes comprise different types of visual indicators.

16. The robotic system of claim 14, wherein the first feedback modes comprises a visual indicator and the second feedback modes comprises an auditory indicator.

17. The robotic system of claim 14, wherein the second feedback modes comprises a visual indicator and an auditory indicator.

18. A non-transitory computer readable medium having stored therein instructions executable by one or more processors to cause a robotic system to perform functions comprising:
   determining, by the robotic system, a motion path of a user in an environment of the robotic system;
   based on the motion path of the user in the environment, determining, by the robotic system, a performance metric corresponding to a position of the user along the motion path;
   based on the determined performance metric, selecting, by the robotic system, a first feedback mode, wherein the first feedback mode comprises at least one indication to the user;
   engaging, by the robotic system, in the first feedback mode;
   determining a change in the performance metric based on a change in the position of the user;
   based on the determined change in the performance metric, selecting, by the robotic system, a second feedback mode, wherein the second feedback mode comprises at least one additional indication to the user different than the at least one indication of the first feedback mode; and engaging, by the robotic system, in the second feedback mode.

* * * * *